United States Patent
Knabe et al.

(10) Patent No.: US 9,300,109 B2
(45) Date of Patent: Mar. 29, 2016

(54) SERIAL SERVO SYSTEM AND METHOD FOR CONTROLLING AN OPTICAL PATH LENGTH AND A REPETITION FREQUENCY OF A MODE-LOCKED LASER

(71) Applicant: Raytheon Company, Waltham, MA (US)

(72) Inventors: Kevin Knabe, Wilmington, CA (US); Andrew N. Daniele, El Segundo, CA (US); Victor Leyva, Pasadena, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/153,224

(22) Filed: Jan. 13, 2014

(65) Prior Publication Data

US 2015/0200519 A1   Jul. 16, 2015

(51) Int. Cl.
*H01S 3/13*   (2006.01)
*H01S 3/131*   (2006.01)
*H01S 3/136*   (2006.01)
*H01S 3/139*   (2006.01)

(52) U.S. Cl.
CPC ............. *H01S 3/13* (2013.01); *H01S 3/1305* (2013.01); *H01S 3/136* (2013.01); *H01S 3/1307* (2013.01); *H01S 3/139* (2013.01); *H01S 3/1317* (2013.01)

(58) Field of Classification Search
CPC ............ H01S 3/06754; H01S 3/08054; H01S 3/10046; H01S 3/1067; H01S 3/1068; H01S 3/1115; H01S 3/13; H01S 3/1307
USPC .......................................................... 372/32
See application file for complete search history.

(56) References Cited

U.S. PATENT DOCUMENTS 6,785,303 B1   8/2004   Holzwarth et al.
6,839,363 B2 *  1/2005   Lin et al. .................... 372/18
(Continued)

FOREIGN PATENT DOCUMENTS

WO   WO-2010127151 A2   11/2010
WO   WO-2011019434 A2    2/2011
WO   WO-2015106187 A1    7/2015

OTHER PUBLICATIONS

Hudson, Darren D., et al., "Mode-locked fiber laser frequency-controlled with an intracavity electro-optic modulator", *Optics Letters*, 30(21), (2005), 2948-2950.
(Continued)

*Primary Examiner* — Jessica Stultz
*Assistant Examiner* — Vu A Vu
(74) *Attorney, Agent, or Firm* — Schwegman Lundberg & Woessner, P.A.

(57) ABSTRACT

A servo system includes multiple servo channels being driven by a common error signal. Each channel has a controller that receives an error signal and provides a drive signal to a driver. The servo channels are arranged serially, with a drive signal from one controller forming the error signal for a downstream controller. As a result, the downstream controller does not attempt to correct for phase error directly, but instead attempts to keep the upstream driver at or near its operational midpoint. The servo channels can be arranged in order of decreasing controller bandwidth, from fastest to slowest. In contrast with a parallel configuration, in which servo channels all simultaneously receive a common error signal, the serial configuration can allow each controller to use its full bandwidth, can eliminate crosstalk between servo channels, and can prevent saturation of upstream drive signals.

14 Claims, 4 Drawing Sheets

(56) References Cited

U.S. PATENT DOCUMENTS

| | | | |
|---|---|---|---|
| 7,106,763 B2 * | 9/2006 | Tan et al. | 372/9 |
| 7,161,967 B2 | 1/2007 | Schnatz | |
| 7,209,498 B1 * | 4/2007 | Chapman et al. | 372/20 |
| 2007/0286248 A1 | 12/2007 | Lee et al. | |
| 2009/0135859 A1 | 5/2009 | Yu et al. | |

OTHER PUBLICATIONS

"International Application Serial No. PCT/US2015/010996, International Search Report mailed May 7, 2015", 4 pgs.

"International Application Serial No. PCT/US2015/010996, Written Opinion mailed May 7, 2015", 6 pgs.

* cited by examiner

SERIAL SERVO SYSTEM AND METHOD FOR CONTROLLING AN OPTICAL PATH LENGTH AND A REPETITION FREQUENCY OF A MODE-LOCKED LASER

TECHNICAL FIELD

Embodiments pertain generally to servo systems. Some embodiments pertain to configuring a servo system that controls a physical quantity by two or more mechanisms that have different bandwidths, speeds, and/or dynamic ranges.

BACKGROUND

In a pulsed laser, light inside the laser circulates along an optical path. In many cases, a repetition rate or repetition frequency of the pulsed laser depends on the optical path length of the optical path. If the optical path length decreases or increases away from a specified value, the repetition rate of the pulsed laser can increase or decrease away from a specified value, which is undesirable.

Accordingly, there exists a need for improving the systems and methods for controlling the optical path length and/or the repetition frequency.

SUMMARY

There are systems in which a servo system monitors and controls a particular physical quantity. For instance, a mode-locked laser can use a servo system to monitor and control an optical path length within the laser, which can stabilize the laser repetition frequency.

In some of these systems, two or more mechanisms can simultaneously control the physical quantity, where the mechanisms can have different bandwidths, speeds, and/or dynamic ranges. For instance, in the mode-locked laser, both an electro-optic modulator and a piezo-electric transducer can simultaneously vary the optical path length. The electro-optic modulator has a relatively large bandwidth, and can therefore vary the optical path length very quickly, but has a limited dynamic range. The piezo-electric transducer has a relatively small bandwidth, and therefore cannot vary the optical path length as quickly as the electro-optic modulator, but has a larger dynamic range than the electro-optic modulator. Using both an electro-optic modulator and a piezo-electric transducer, simultaneously, to control the optical path length can, in principle, provide servo control with a relatively fast speed and with a relatively large dynamic range.

In practice, it is difficult to use multiple mechanisms to control the same physical quantity. For the example of the mode-locked laser, if both the electro-optic modulator and the piezo-electric transducer are controlled by the same phase error signal, both make uncoordinated corrections to the optical path length in parallel, and can conflict with each other. To avoid such conflicts, the electro-optic modulator and the piezo-electric transducer can be detuned with respect to each other, which can be inefficient.

A serial servo system includes multiple servo channels being driven by a common error signal. Each channel has a controller that receives an error signal and provides a drive signal to a driver. The servo channels are arranged serially, with a drive signal from one controller forming the error signal for a downstream controller. As a result, the downstream controller does not attempt to correct for phase error directly, but instead attempts to keep the upstream driver at or near its operational midpoint. The servo channels can be arranged in order of decreasing controller bandwidth, from fastest to slowest.

In contrast with a parallel configuration, in which servo channels all simultaneously receive a common error signal, the serial configuration can allow each controller to use its full bandwidth, can eliminate crosstalk between servo channels, and can prevent saturation of upstream drive signals. In some examples, the serial servo system can be used to control an optical path length in a mode-locked pulsed laser, which can stabilize the laser repetition frequency.

This summary is intended to provide an overview of subject matter of the present patent application. It is not intended to provide an exclusive or exhaustive explanation of the invention. The Detailed Description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
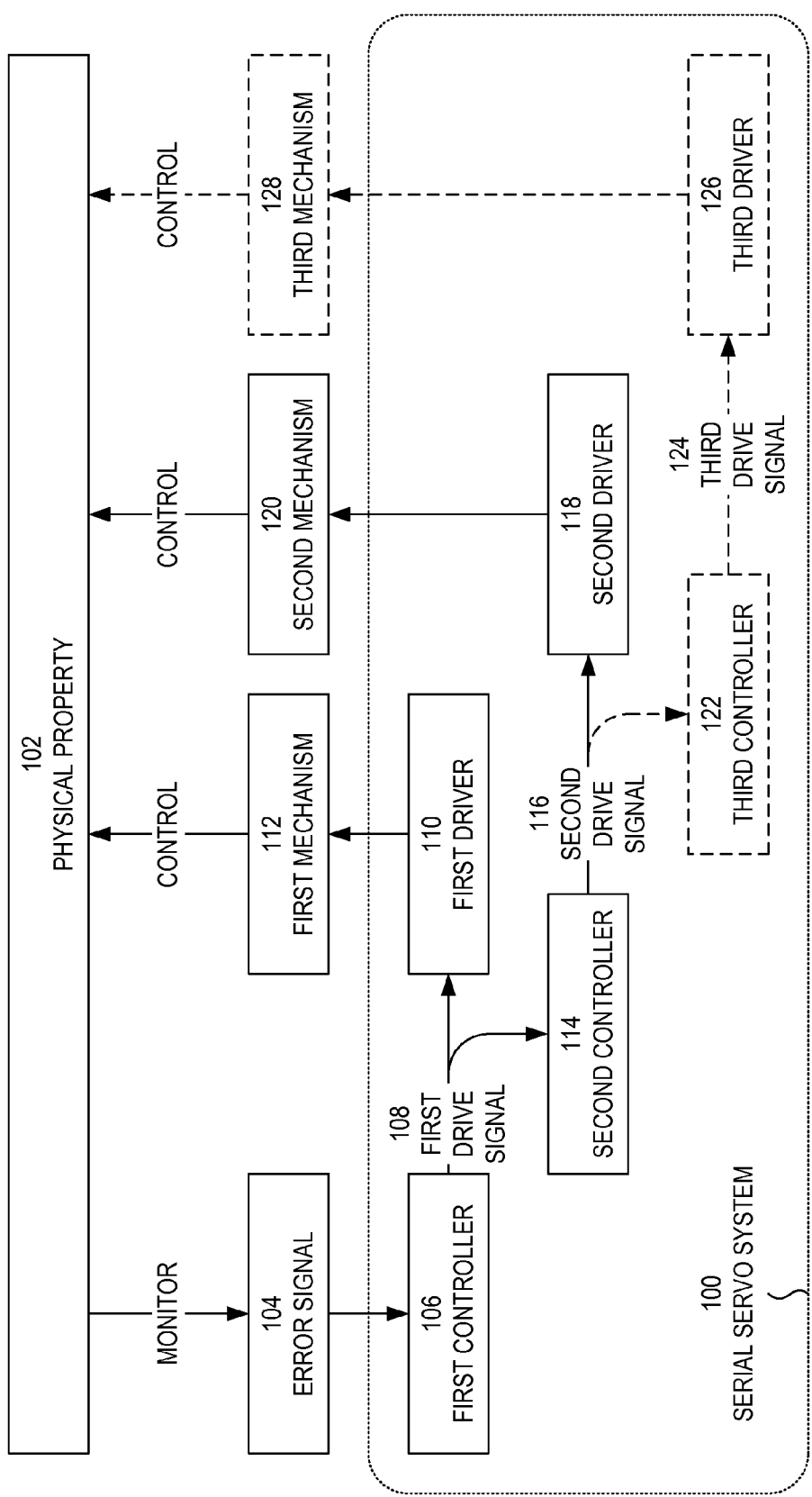
FIG. 1 is a schematic drawing of an example of a serial servo system for monitoring and controlling a physical property, in accordance with some embodiments.

FIG. 1 is a schematic drawing of an example of a serial servo system 100 for monitoring and controlling a physical property 102.

A error signal 104 monitors the physical property 102, and is configured to vary in response to variation of the physical property 102. In most cases, the error signal 104 passes through zero when the physical property 102 has a specified value. The error signal 104 is negative when the physical property 102 is on one side of the specified value, and is positive when the physical property 102 is on an opposite side of the specified value. In some examples, the error signal 104 is monotonic, with respect to the physical property 102. In other examples, the error signal 104 can be periodic, with respect to the physical property 102, and the servo system 100 can operate on one period of the periodic signal.

A first controller 106 is configured to receive the error signal 104 and generate a first drive signal 108 in response to the error signal 104. A first driver 110 is configured to receive the first drive signal 108 and adjust the physical property 102 in response to the first drive signal 108. The first driver 110 drives a first mechanism 112 to adjust the physical property 102. The first driver 110 and first mechanism 112 have a first bandwidth, which can be related to the speed at which the first driver 110 and first mechanism 112 can respond. The greater the bandwidth, the faster the driver can control the physical property 102.

A second controller 114 is configured to receive the first drive signal 108 and generate a second drive signal 116 in response to the first drive signal 108. A second driver 118 is configured to receive the second drive signal 116 and adjust the physical property 102 in response to the second drive signal 116. The second driver 118 drives a second mechanism 120 to adjust the physical property 102. The second driver 118 and second mechanism 120 have a second bandwidth less than the first bandwidth, so that the second mechanism 120 responds more slowly than the first mechanism 112.

An optional third controller 122 is configured to receive the second drive signal 116 and generate a third drive signal 124 in response to the second drive signal 116. An optional third driver 126 is configured to receive the third drive signal 124 and adjust the physical property 102 in response to the third drive signal 124. The third driver 126 has a third bandwidth less than the second bandwidth. The third driver 126 drives a third mechanism 128 to adjust the physical property 102, so that the third mechanism 128 responds more slowly than the second mechanism 120. The third controller 122 can also generate an optional additional error signal (not shown in FIG. 1), which can drive a downstream controller, or can be used to measure a fidelity of the serial servo system 100.

In the example of FIG. 1, the physical property 102, the error signal 104, the first mechanism 112, the second mechanism 120, and the third mechanism 128 are not part of the serial servo system 100. In other examples, any or all of these elements can be part of the serial servo system 100.

Figure 2:
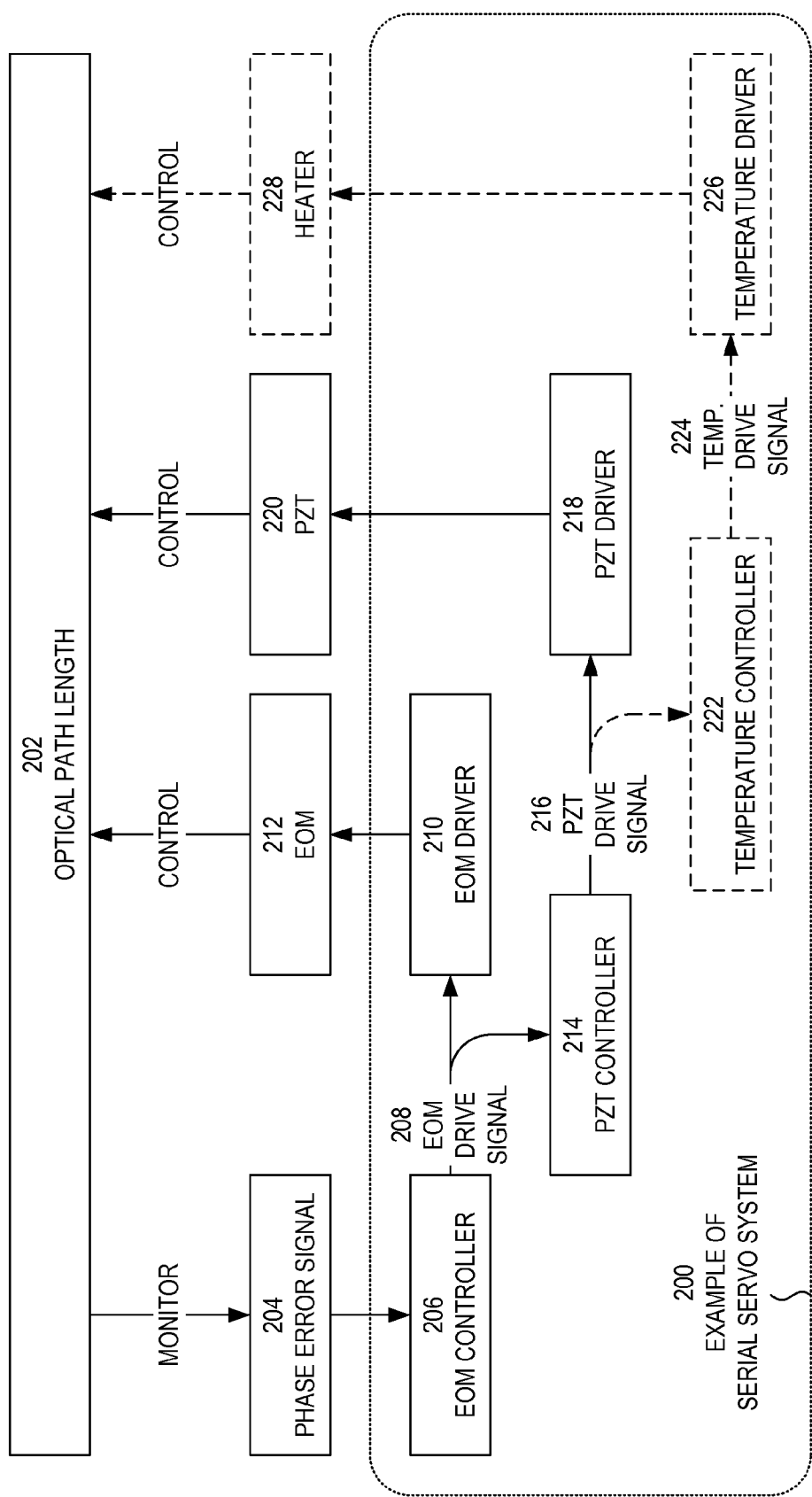
FIG. 2 is a schematic drawing of an example of a serial servo system for monitoring and controlling an optical path length, in accordance with some embodiments.

FIG. 2 provides a tangible example for the schematic framework of FIG. 1. FIG. 2 is a schematic drawing of an example of a serial servo system 200 for stabilizing a pulsed laser by monitoring and controlling an optical path length 202 within the laser, and consequently stabilizing a repetition frequency of the pulsed laser. The laser can be mode-locked.

A phase error signal 204 monitors the optical path length 202, and is configured to vary in response to variation of the optical path length 202. In some examples, the phase error signal 204 crosses zero when a repetition frequency of the comb is exactly equal to a reference RF synthesizer. The phase error signal 204 can be positive (or negative) when the repetition frequency has a higher frequency than the reference synthesizer, and can be negative (or positive) when the repetition frequency has a lower frequency than the reference synthesizer. The absolute sign of the phase error depends on the sign of the gain and the implementation of the phase error signal (switching inputs on phase detector introduces a minus sign).

An electro-optic modulator (EOM) controller 206 is configured to receive the phase error signal 204 and generate an EOM drive signal 208 in response to the phase error signal 204. An EOM driver 210 is configured to receive the EOM drive signal 208 and adjust the optical path length 202 in response to the EOM drive signal 208. The EOM driver 210 drives an EOM 212 to adjust the optical path length 202. The EOM driver 210 and EOM 212 have an EOM bandwidth, which can be on the order of $10^5$ Hz. The EOM 212 can adjust the optical path length 202 relatively quickly, but has a relatively small dynamic range, or stroke.

A piezo-electric transducer (PZT) controller 214 is configured to receive the EOM drive signal 208 and generate a PZT drive signal 216 in response to the EOM drive signal 208. A PZT driver 218 is configured to receive the PZT drive signal 216 and adjust the optical path length 202 in response to the PZT drive signal 216. The PZT driver 218 drives a PZT 220 to adjust the optical path length 202. The PZT driver 218 and PZT 220 have a PZT bandwidth, which can be on the order of $10^1$ Hz. The PZT bandwidth is less than the EOM bandwidth. The PZT 220 responds more slowly than the EOM 212 and has a greater stroke than the EOM 212.

An optional temperature controller 222 is configured to receive the PZT drive signal 216 and generate a temperature drive signal 224 in response to PZT drive signal 216. An optional temperature driver 226 is configured to receive the temperature drive signal 224 and adjust the optical path length 202 in response to the temperature drive signal 224. The temperature driver 226 drives a heater 228 to adjust the optical path length 202. The temperature driver 226 and heater 228 have a heater bandwidth that is less than the PZT bandwidth. The heater 228 responds more slowly than the PZT 220 and has a greater stroke than the PZT 220.

The EOM controller 206, PZT controller 214, and temperature controller 222 are configured serially, so that a drive signal from one controller is used as an error signal to drive a downstream controller. For instance, the PZT controller 214 does not respond to the phase error signal 204, but instead responds to the EOM drive signal 208. Responding to the EOM drive signal 208 can help ensure that the EOM 212 operates at or near an operational midpoint of its stroke. In some examples, it can be advantageous for the EOM 212 to operate at or near the operational midpoint of its stroke. Such operation can prevent or reduce saturation of the EOM drive signal 208. Addition of a temperature servo loop can help keep the PZT 220 at or near an operational midpoint of its stroke as well, which can also be advantageous. In some examples, it may be desirable to keep the EOM 212 at or near a specified setpoint that is offset from an operational midpoint of its stroke.

Figure 3:
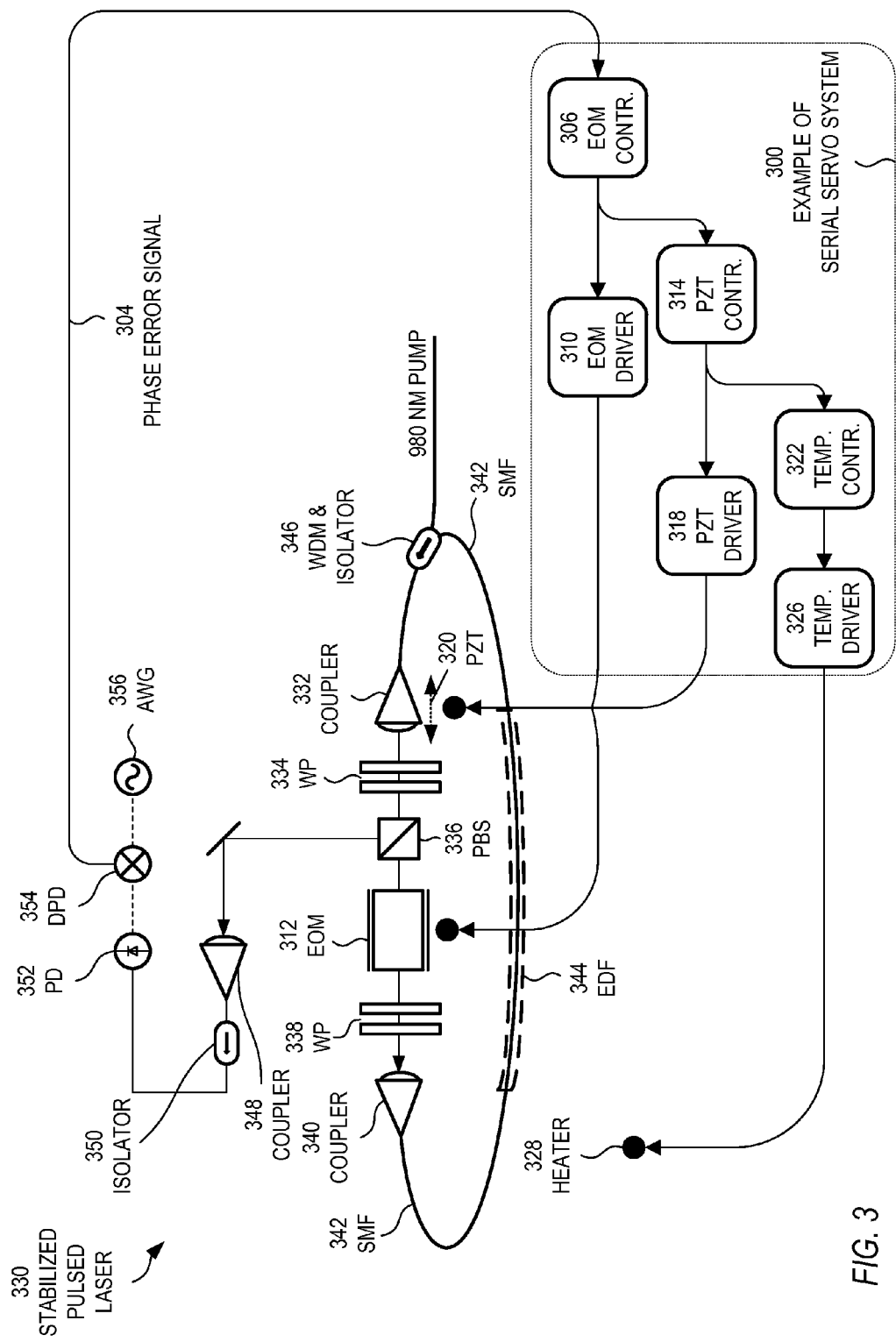
FIG. 3 is a schematic drawing of an example of a stabilized pulsed laser, in which an electro-optic modulator, a piezo-electric transducer, and a heater control an optical path length, in accordance with some embodiments.

FIG. 3 is a schematic drawing of an example of a stabilized pulsed laser 330 that includes an example of a serial servo system 300. Elements numbered between 300 and 328 are similar in structure and function to corresponding elements 200 through 228 in FIG. 2.

The stabilized pulsed laser 330 in FIG. 3 is used to form a stable microwave signal. The laser 330 is passively mode-locked, with a frequency spectrum that resembles a comb, with peaks about every 100 MHz. In the time domain, the output of the laser 330 also resembles a comb, with pulses about every 10 nsec. The pulses are split off from a closed optical path and are directed onto a photodetector to form the microwave signal.

The closed optical path in the pulsed laser 330 extends counterclockwise in FIG. 3, from a coupler 332, to a wave plate 334, to a polarizing beam splitter 336, to an electro-optic modulator 312, to another wave plate 338, to another coupler 340, through a length of single mode fiber 342 that includes a portion of erbium-doped fiber 344 to provide gain, through a wavelength division multiplexer and isolator 346 that couples in a 980 nm pump beam, and back to the coupler 332.

The polarizing beam splitter 336 splits off a portion of the beam from the optical path, and directs the beam to a coupler 348 and into a fiber, through an isolator 350, to a photodetector 352. The photodetector 352 converts the incident pulsed optical signal to a pulsed electrical signal. The pulsed electrical signal is directed to a digital phase detector 354 that produces a phase error signal 304, and to an arbitrary waveform generator 356 that can function as an RF synthesizer.

The phase error signal 304 is directed as input to the serial servo system 300. The serial servo system 300 controls the optical path length of the closed optical path in three different locations—at the EOM 312, the PZT 320, and the heater 328. All three of the EOM 312, the PZT 320, and the heater 328 can lengthen or contract the optical path length, and all three operate simultaneously, as described above.

Figure 4:
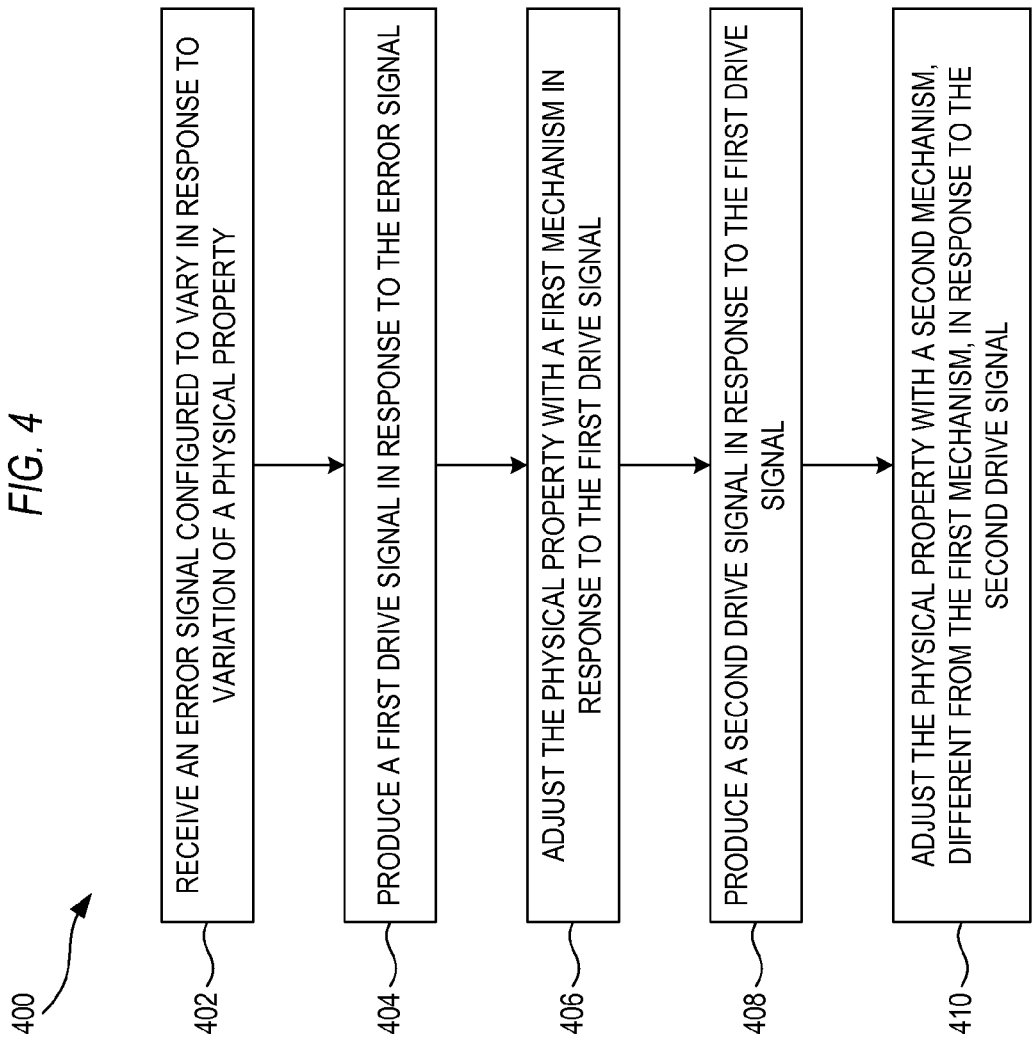
FIG. 4 is a flow chart of an example of a method of operation of a serial servo system, in accordance with some embodiments.

FIG. 4 is a flow chart of an example of a method 400 for monitoring and controlling a physical property. The physical property can be an optical path length 202, or another suitable physical property. The method 400 can be used with the serial servo systems 100, 200, 300, as described above, or with other suitable servo systems.

At 402, method 400 receives an error signal configured to vary in response to variation of the physical property. The error signal can be a phase error signal 204, 304, or can be another suitable error signal. At 404, method 400 produces a first drive signal in response to the error signal. The first drive signal can be an EOM drive signal 208, or can be another suitable drive signal. At 406, method 400 adjusts the physical property with a first mechanism in response to the first drive signal. The first mechanism can be an EOM 212, 312, or can be another suitable mechanism. At 408, method produces a second drive signal in response to the first drive signal. The second drive signal can be a PZT drive signal 216, or can be another suitable drive signal. At 410, method 400 adjusts the physical property with a second mechanism, different from the first mechanism, in response to the second drive signal. The second mechanism can be a PZT 220, or can be another suitable mechanism.

The servo system can include a computer system that includes hardware, firmware and software. Examples may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some examples, computer systems can include one or more processors, optionally connected to a network, and may be configured with instructions stored on a computer-readable storage device.

What is claimed is:

1. A serial servo system for monitoring and controlling an optical path length, the serial servo system comprising:
  a first controller configured to receive an error signal and generate a first drive signal in response to the error signal, the error signal configured to vary in response to variation of the optical path length;
  a first driver configured to receive the first drive signal and adjust the optical path length with an electro-optic modulator in response to the first drive signal;
  a second controller configured to receive the first drive signal and generate a second drive signal in response to the first drive signal; and
  a second driver configured to receive the second drive signal and adjust the optical path length with a piezo-electric transducer in response to the second drive signal;
  wherein the piezo-electric transducer responds more slowly than the electro-optic modulator and has a greater stroke than the electro-optic modulator.

2. A serial servo system of claim 1, further for monitoring and controlling a physical property, the serial servo system comprising:
  a first controller configured to receive an error signal and generate a first drive signal in response to the error signal, the error signal configured to vary in response to variation of the physical property;
  a first driver configured to receive the first drive signal and adjust the physical property in response to the first drive signal, the first driver configured to adjust the physical property with a first device having a first stroke;
  a second controller configured to receive the first drive signal and generate a second drive signal in response to the first drive signal;
  a second driver configured to receive the second drive signal and adjust the physical property in response to the second drive signal, the second driver configured to adjust the physical property so that the first device operates at or near a first specified setpoint within the first stroke;
  a third controller configured to receive the second drive signal and generate a third drive signal in response to the second drive signal; and
  a third driver configured to receive the third drive signal and adjust the physical property in response to the third drive signal.

3. The serial servo system of claim 2, wherein the first, second, and third drivers adjust the physical property via different mechanisms.

4. The serial servo system of claim 2,
  wherein the physical property is an optical path length;
  wherein the second driver adjusts the optical path length with a piezo-electric transducer; and
  wherein the third driver adjusts the optical path length with a heater.

5. The serial servo system of claim 4, wherein the third controller generates the third drive signal to keep the piezo-electric transducer at or near an operational midpoint of its stroke.

6. The serial servo system of claim 4, wherein the third controller generates the third drive signal to keep the piezo-electric transducer at or near a specified setpoint that is offset from an operational midpoint of its stroke.

7. A serial servo system for monitoring and controlling an optical path length, the serial servo system comprising:
  a first controller configured to receive an error signal and generate a first drive signal in response to the error signal, the error signal configured to vary in response to variation of the optical path length;
  a first driver configured to receive the first drive signal and adjust the optical path length in response to the first drive signal;
  a second controller configured to receive the first drive signal and generate a second drive signal in response to the first drive signal;
  a second driver configured to receive the second drive signal and adjust the optical path length with a piezo-electric transducer in response to the second drive signal;
  a third controller configured to receive the second drive signal and generate a third drive signal in response to the second drive signal; and
  a third driver configured to receive the third drive signal and adjust the optical path length with a heater in response to the third drive signal;
  wherein the heater responds more slowly than the piezo-electric transducer and has a greater stroke than the piezo-electric transducer.

8. A serial servo system for stabilizing a pulsed laser, the pulsed laser including an optical path having an optical path length, the serial servo system comprising:

an electro-optic modulator controller configured to receive a phase error signal and generate an electro-optic modulator drive signal in response to the phase error signal, the phase error signal configured to vary in response to variation of the optical path length;

an electro-optic modulator driver configured to receive the electro-optic modulator drive signal and adjust the optical path length with an electro-optic modulator in response to the electro-optic modulator drive signal;

a piezo-electric transducer controller configured to receive the electro-optic modulator drive signal and generate a piezo-electric transducer drive signal in response to the electro-optic modulator drive signal, the piezo-electric transducer controller configured to generate the piezo-electric transducer drive signal to keep the electro-optic modulator driver at or near a specified setpoint within its stroke;

a piezo-electric transducer driver configured to receive the piezo-electric transducer drive signal and adjust the optical path length with a piezo-electric transducer in response to the piezo-electric transducer drive signal;

a temperature controller configured to receive piezo-electric transducer drive signal and generate a temperature drive signal in response to the piezo-electric transducer drive signal;

a temperature driver configured to receive the temperature drive signal and adjust the optical path length with a heater in response to the temperature drive signal.

9. The serial servo system of claim 8, wherein the piezo-electric transducer controller generates the piezo-electric transducer drive signal to keep the electro-optic modulator at or near an operational midpoint of its stroke.

10. The serial servo system of claim 8, wherein the piezo-electric transducer controller generates the piezo-electric transducer drive signal to keep the electro-optic modulator at or near a specified setpoint that is offset from an operational midpoint of its stroke.

11. The serial servo system of claim 8, wherein the temperature controller generates the temperature drive signal to keep the piezo-electric transducer at or near an operational midpoint of its stroke.

12. The serial servo system of claim 8, wherein the temperature controller generates the temperature drive signal to keep the piezo-electric transducer at or near a specified setpoint that is offset from an operational midpoint of its stroke.

13. A serial servo system for stabilizing a pulsed laser, the pulsed laser including an optical path having an optical path length, the serial servo system comprising:

an electro-optic modulator controller configured to receive a phase error signal and generate an electro-optic modulator drive signal in response to the phase error signal, the phase error signal configured to vary in response to variation of the optical path length;

an electro-optic modulator driver configured to receive the electro-optic modulator drive signal and adjust the optical path length with an electro-optic modulator in response to the electro-optic modulator drive signal;

a piezo-electric transducer controller configured to receive the electro-optic modulator drive signal and generate a piezo-electric transducer drive signal in response to the electro-optic modulator drive signal;

a piezo-electric transducer driver configured to receive the piezo-electric transducer drive signal and adjust the optical path length with a piezo-electric transducer in response to the piezo-electric transducer drive signal;

a temperature controller configured to receive piezo-electric transducer drive signal and generate a temperature drive signal in response to the piezo-electric transducer drive signal;

a temperature driver configured to receive the temperature drive signal and adjust the optical path length with a heater in response to the temperature drive signal;

wherein the piezo-electric transducer responds more slowly than the electro-optic modulator and has a greater stroke than the electro-optic modulator; and wherein the heater responds more slowly than the piezo-electric transducer and has a greater stroke than the piezo-electric transducer.

14. A method for monitoring and controlling an optical path length, the method comprising receiving a phase error signal configured to vary in response to variation of the optical path length;

producing a first drive signal in response to the phase error signal;

adjusting the optical path length with an electro-optic modulator in response to the first drive signal;

producing a second drive signal in response to the first drive signal; and adjusting the optical path length with a piezo-electric transducer in response to the second drive signal but not in response to the phase error signal.

* * * * *